United States Patent [19]

Nilssen

[11] Patent Number: 4,608,523
[45] Date of Patent: Aug. 26, 1986

[54] PHASE CORRECTION FOR SERIES-RESONANT BALLASTS

[76] Inventor: Ole K. Nilssen, Caesar Dr. RR. 5, Barrington, Ill. 60010

[21] Appl. No.: 570,969

[22] Filed: Jan. 16, 1984

[51] Int. Cl.$^4$ .................. H05B 37/00; H05B 39/00; H05B 41/14
[52] U.S. Cl. .................. 315/244; 315/242; 315/243; 315/DIG. 7
[58] Field of Search ......... 315/244, 243, 242, DIG. 5, 315/DIG. 7

[56] References Cited

U.S. PATENT DOCUMENTS

| | | | |
|---|---|---|---|
| 2,333,499 | 11/1943 | Warren | 315/244 X |
| 2,417,742 | 3/1947 | Dosio | 315/244 X |
| 2,695,375 | 11/1954 | Mendenhall et al. | 315/244 |
| 3,555,352 | 1/1971 | Michalski | 315/244 |
| 3,586,817 | 6/1971 | Manz | 315/244 |
| 4,358,712 | 11/1982 | Filgas, Jr. et al. | 315/244 |

*Primary Examiner*—Saxfield Chatmon

[57] ABSTRACT

In a series-resonant ballast, the voltage from an AC power source is applied directly across a ballast circuit consisting of a series-combination of an inductor and a capacitor—with a gas discharge lamp connected in parallel with the capacitor. Before the lamp ignites, the series-combination is substantially resonant at the frequency of the AC source; and, by way of resonant Q-multiplication, the voltage developed across the capacitor is of much higher magnitude than that of the voltage provided directly from the power source. This Q-multiplied voltage is effective in causing lamp ignition. Once the lamp has ignited, however, the circuit is no longer resonant. Rather, due to the loading provided by the ionized lamp, the circuit has now become inductive at the frequency of the AC source; which implies that the power provided to the lamp from the source is not provided at an optimum power factor. To compensate for the de-tuning caused by lamp loading, subject invention provides for phase-correction means that automatically takes effect upon lamp ignition, and which is effective in keeping the ballast circuit operating at or near resonance even after lamp ignition. In the preferred embodiment, this phase-correction means consists of an auxiliary inductor connected in series with the lamp. Before lamp ignition, this auxiliary inductor has negligible effect on the circuit; but after ignition, it acts to cancel the otherwise net inductive reactance of the circuit, thereby keeping it substantially in resonance.

2 Claims, 2 Drawing Figures 4,608,523

1

PHASE CORRECTION FOR SERIES-RESONANT BALLASTS

BACKGROUND OF THE INVENTION

1. Field of Invention

The present invention relates to series-resonant ballast means for gas discharge lamps, and more particularly to means for keeping the ballast substantially in resonance both before and after lamp ignition.

2. Description of Prior Art

A series-resonant ballast refers to an arrangement wherein a gas discharge lamp is connected in parallel with the capacitor of a resonant inductor-capacitor series-combination—where this series-combination is connected directly across an AC supply voltage, and where the natural resonance frequency of the series-combination is substantially the same as the fundamental frequency of this supply voltage.

Series-resonant ballasting principally applies to situations where the frequency of the supply voltage is relatively high (on the order of 20 to 40 kHz), and is described in several prior art references—such as in the following U.S. Patents: No. 3,710,177 to Ward, No. 4,207,497 to Capewell et al, No. 4,207,498 to Spira et al, No. 4,346,332 to Walden, and No. 4,370,600 to Zansky.

Series-resonant ballasting means is generally considered to provide for a good power factor in terms of the power drawn from the power supply by the ballast. After all, a truly resonant circuit draws power with unity power factor.

However, due to the particular nature of the gas discharge lamp, it has not been possible in a series-resonant ballast to maintain a good power factor (i.e., substantial resonance) both before and after lamp ignition. That is: if the ballast circuit is arranged to be in resonance before lamp ignition—which is desirable in order to generate an adequately high lamp starting voltage—it will become non-resonant after the lamp has ignited (it will, in fact, become inductive) and will therefore draw power with a poor power factor; and, if the ballast circuit is arranged to be in resonance during normal lamp operation—which is desirable from a power-factor viewpoint—it will be non-resonant prior to lamp ignition (it will then be capacitive) and will therefore not provide the desired high lamp starting voltage.

Of course, in some situations the problem might be resolved by providing for the frequency of the supply voltage to decrease after lamp ignition; but that is not easy to accomplish in a cost-effective manner—especially not when several ballast circuits are operated from the same supply voltage.

SUMMARY OF THE INVENTION

Objects of the Invention

One object of the present invention is that of providing for a gas discharge lamp an improved series-resonant ballast means.

Another object is that of providing for a gas discharge lamp a series-resonant ballast means that operates substantially in a resonant mode both before and after lamp ignition.

Still another object is that of providing for a gas discharge lamp a series-resonant ballast means that operates with a good power factor both before and after lamp ignition.

2

These as well as other objects, features and advantages of the present invention will become apparent from the following description and claims.

Brief Description

In a series-resonant ballast of conventional design, the voltage from an AC power source is applied directly across a ballast circuit consisting of a series-combination of an inductor and a capacitor—with a gas discharge lamp connected in parallel with the capacitor.

Before the lamp ignites, the series-combination is substantially resonant at the frequency of the AC source; and, by way of resonant Q-multiplication, the voltage developed across the capacitor is of much higher magnitude than that of the voltage provided directly from the power source. This Q-multiplied voltage is effective in causing lamp ignition.

Once the lamp has ignited, however, the circuit is no longer resonant. Rather, due to the loading provided by the ionized lamp, the circuit has now become inductive at the frequency of the AC source; which implies that the power provided to the lamp from the source is not any longer provided at an optimum power factor.

To compensate for circuit de-tuning caused by lamp loading, subject invention provides for phase-correction means that automatically takes effect upon lamp ignition, and which is effective in keeping the ballast circuit operating at or near resonance even after lamp ignition.

In the preferred embodiment, this phase-correction means consists of an auxiliary inductor connected in series with the lamp. Before lamp ignition, this auxiliary inductor has negligible effect on the circuit; but after ignition, it acts to cancel the circuit's otherwise net inductive reactance, thereby keeping the circuit substantially in resonance.

DESCRIPTION OF THE PREFERRED EMBODIMENT

Description of the Drawings

Figure 1:
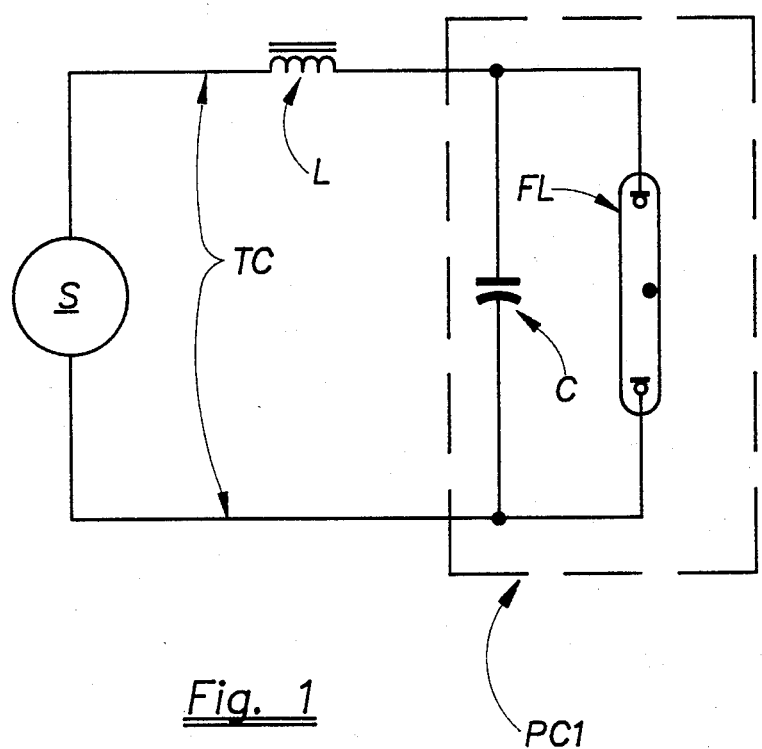
FIG. 1 shows the circuit arrangement for a series-resonant ballast according to prior art.

In FIG. 1, a source S provides a voltage of about 100 Volt RMS at a frequency of approximately 30 kHz across a pair of terminal conductors TC. Connected across terminal conductors TC is a series-combination of an inductor L and a parallel-circuit PC1; which parallel-circuit consists of a capacitor C connected directly in parallel with an instant-start fluorescent lamp FL.

Figure 2:
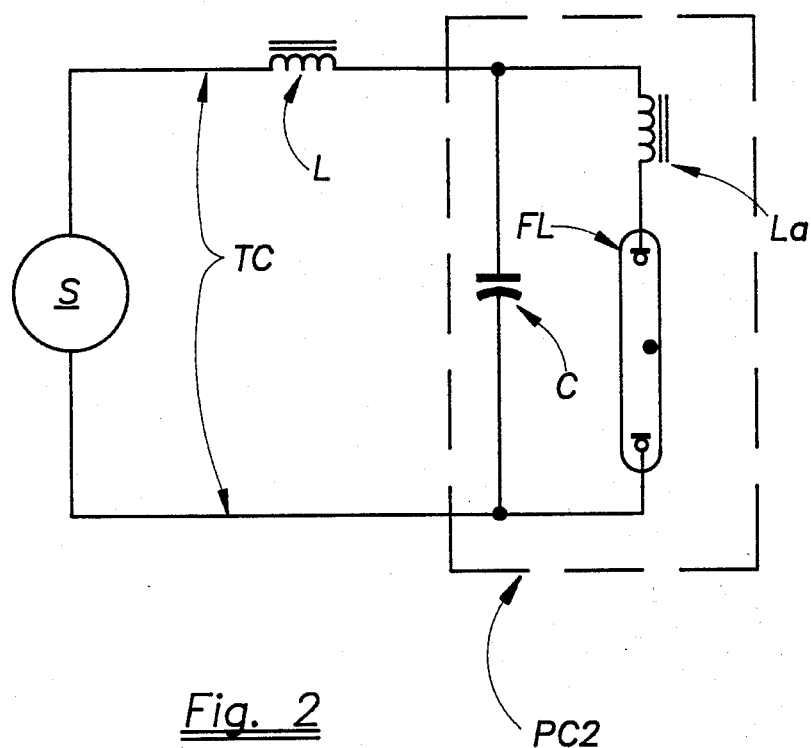
FIG. 2 shows the circuit arrangement for a series-resonant ballast modified according to the present invention.

In FIG. 2, source S provides the same 100 Volt/30 kHz voltage across the same terminal conductors TC, across which is connected a series-combination of inductor L and a parallel-circuit PC2; which parallel-circuit consists of capacitor C connected directly in parallel with the series-combination of an auxiliary inductor La and the instant-start fluorescent lamp FL.

Description of Operation

The operation of the circuit of FIG. 1 may be explained as follows.

In FIG. 1, before the fluorescent lamp ignites, the 100 Volt/30 kHz voltage from source S is applied directly across the series-combination of L and C. This L-C series-circuit is substantially resonant at 30 kHz, and therefore—by way of Q-multiplication—develops across capacitor C a voltage of magnitude several times higher than that of the 100 Volt/30 kHz voltage present across terminal conductors TC.

The high-magnitude voltage developed across C is effective in instant-starting the fluorescent lamp; which lamp in effect constitutes a voltage-limiting circuit protection means.

However, once the lamp is operating, it represents a substantial load to the L-C series-circuit—thereby causing circuit de-turning. In other words, if the non-loaded L-C series-circuit is in resonance at 30 kHz, then the same L-C series-circuit loaded with an operating fluorescent lamp is in resonance at some lower frequency.

In an illustrative situation, the values for the 30 kHz reactance of L and C are $+j300$ Ohm and $-j300$ Ohm, respectively, and the effective load resistance of FL when operating at nominal light intensity is 300 Ohm resistive. Thus, before the lamp ignites, the circuit is indeed series-resonant, in that the lamp load is non-present, while the inductive and the capacitive reactances cancel each other.

However, once the lamp is in operation, the circuit is composed of a $+j300$ Ohm reactance connected in series with the parallel-combination of a $-j300$ Ohm reactance and a 300 Ohm resistance. This parallel-combination, if re-configured into a series-equivalent, consists of a $-j150$ Ohm reactance in series with a 150 Ohm resistance.

Thus, as soon as the lamp ignites, the circuit becomes non-resonant—being a series-connection of $+j300$ Ohm (inductive), $-j150$ Ohm (capacitive), and 150 Ohm (resistive); which is equivalent to $+j150$ Ohm (inductive) and 150 Ohm (resistive).

In other words, with the typical values used in the above example, with the lamp in operation, the current will be lagging the voltage by 45 degrees, which implies the relatively poor power factor of approximately 0.71. In fact, the circuit will draw a current of 0.47 Amp and will provide a power of 33.3 Watt to the lamp.

The operation of the circuit of FIG. 2 may be explained as follows.

The circuit of FIG. 2 is identical to that of FIG. 1 except for the auxiliary inductor La. Therefore, up to the point of lamp ignition, it operates in an identical manner.

After lamp ignition, however, the auxiliary inductor La provides for full or partial cancellation of the net inductance that otherwise would then exist.

In an illustrative situation corresponding to the one provided in connection with the FIG. 1 circuit, the values for the 30 kHz reactance of L, C, and La are: $+j300$ Ohm, $-j300$ Ohm, and $+j300$ Ohm, respectively; and the effective load resistance of FL when operating at nominal light intensity is 300 Ohm resistive.

Thus, before the lamp ignites, the circuit is indeed series-resonant, in that the lamp load is non-present, while the reactances of L and C cancel each other. And, of course, since the lamp is non-conductive, the auxiliary inductor is in effect non-connected.

However, once the lamp is in operation, the circuit is composed of a $+j300$ Ohm reactance (due to L) connected in series with the PC2 parallel-combination, which consists of a $-j300$ Ohm reactance (due to C) coupled in parallel with a series-combination consisting of a $+j300$ Ohm reactance (due to La) and a 300 Ohm resistance (due to FL).

This latter series-combination, if computed into its equivalent parallel-configuration, is equivalent to a $+j600$ Ohm reactance connected in parallel with a 600 Ohm resistance; and, or course, this parallel-configuration is connected in parallel with the capacitor C. Thus, the total PC2 parallel-combination consists of three impedances connected in parallel: a $-j300$ Ohm reactance (due to C), a $+j600$ Ohm reactance (due to the re-configured L), and a 600 Ohm resistance (due to the re-configured FL); which means that the PC2 parallel-combination can be represented simply by a $-j600$ Ohm reactance (the combined effect of the C and La reactances) in parallel with a 600 Ohm resistance.

Now, re-configuring the PC2 parallel-combination into an equivalent series-configuration, the result is a $-j300$ Ohm reactance in series with a 300 Ohm resistance; which, when combined with the $+j300$ Ohm of L, implies complete resonance.

Thus, with the component values of the above example, the circuit of FIG. 2 is resonant both before and after lamp ignition; and, after lamp ignition, the circuit will draw a current of 0.33 Amp at unity power factor, which implies that it will provide 33 Watt to the lamp.

With the particular values of the above example, complete resonance was provided for both before and after lamp ignition. However, in many situations—especially those involving inverter-type electronic ballasts—it is desirable that the circuit be somewhat inductive both before and after lamp ignition. This can readily be accomplished, as for instance by increasing the inductance of L while decreasing the inductance of La.

It is believed that the present invention and its several attendant advantages and features will be understood from the preceeding description. However, without departing from the spirit of the invention, changes may be made in its form and in the construction and interrelationships of its component parts, the form herein described merely representing the presently preferred embodiment.

I claim:

1. A ballast means adapted to power a gas discharge lamp from a source of AC voltage, said source having a pair of output terminals, said ballast means comprising:
   a first inductor means connected in series with a capacitor means, thereby to form a first series-circuit;
   first connect means operable to permit connection of said first series-circuit across said pair of output terminals;
   a second inductor means connected in series with said gas discharge lamp, thereby to form a second series-circuit; and
   second connect means operable to connect said second series-circuit in parallel with said capacitor means;
   whereby, whenever only the first series-circuit is connected with the output terminals, power is drawn from the AC source at a power factor that is substantially the same as the power factor at which power is drawn from the AC source when said second series-circuit is connected in parallel with said capacitor means, the first series circuit having an unloaded Q factor, the first series circuit in combination with said second series circuit having a loaded Q factor, the unloaded Q factor being substantially larger than the loaded Q factor.

2. An arrangement for ballasting a gas discharge lamp, comprising:
- a source of AC voltage of frequency substantially higher than that of the voltage on an ordinary electric utility power line, said source having a pair of output terminals;
- a first inductor means connected in series with a capacitor means to form a first series-circuit, this first series-circuit being: (i) connected across said output terminals and (ii) resonant at or near the frequency of said AC voltage; and
- a second inductor means connected in series with a gas discharge lamp, thereby to form a second series-circuit, this second series-circuit being operable to be connected in parallel with said capacitor means and, when so connected, operative to cause the combination of said first series-circuit and said second series-circuit to be resonant at or near the frequency of said AC voltage;
- whereby the connection of said series-circuit is accomplished substantially without change in the power factor at which power is drawn from said source, the first series circuit having a first Q factor, the first series circuit in combintion with said second series circuit having a second Q factor, the first Q factor being substantially larger than the second Q factor.

* * * * *